Oct. 5, 1948.  E. W. JOHNSON  2,450,731
SHOCK ABSORBER
Filed March 19, 1946  3 Sheets-Sheet 1
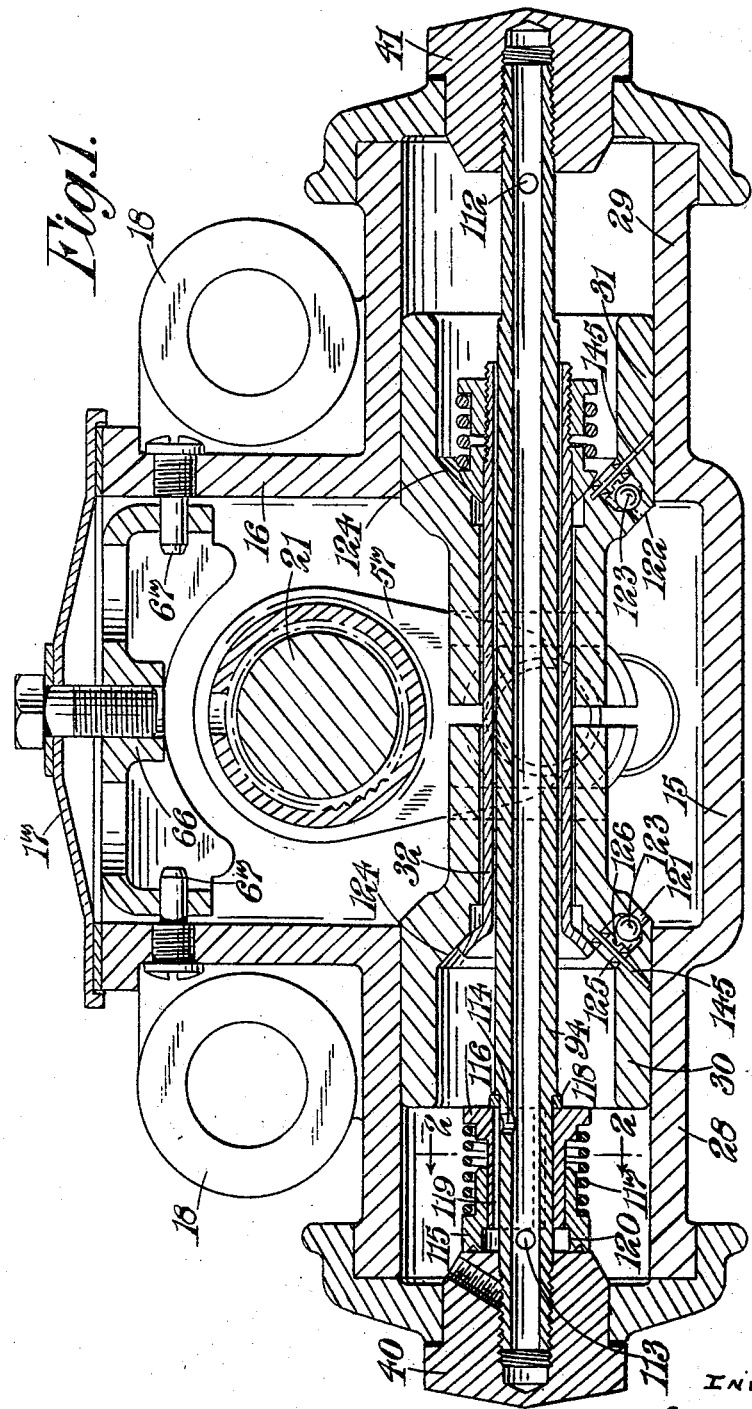
INVENTOR
E. W. Johnson
By Watson, Cole, Grindle & Watson Oct. 5, 1948.  E. W. JOHNSON  2,450,731
SHOCK ABSORBER
Filed March 19, 1946  3 Sheets-Sheet 2
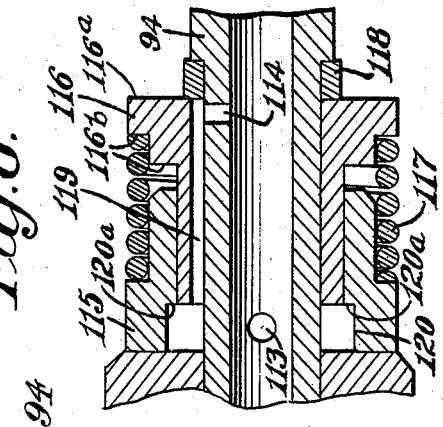
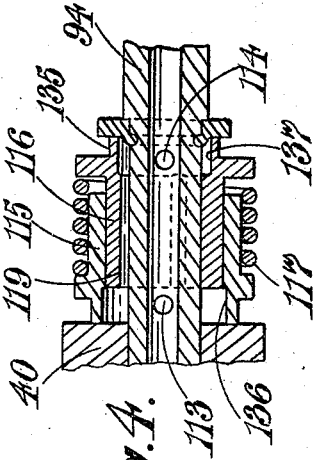
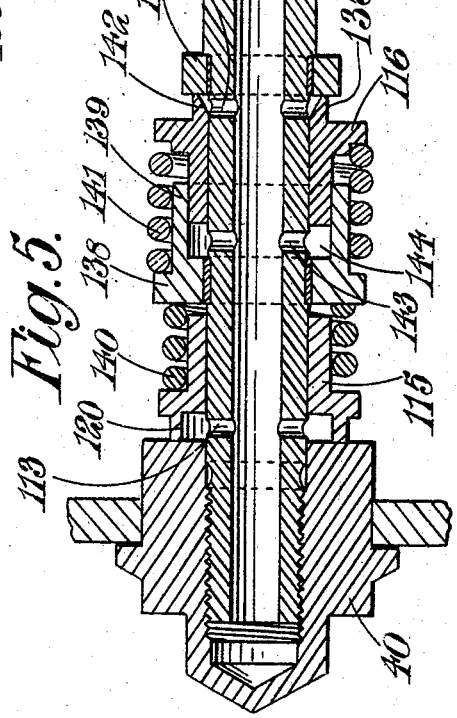
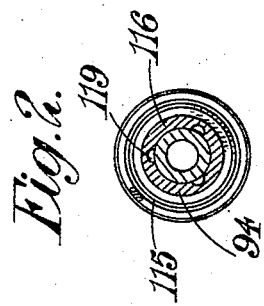
INVENTOR
E. W. Johnson
By Watson, Cole, Grindle & Watson

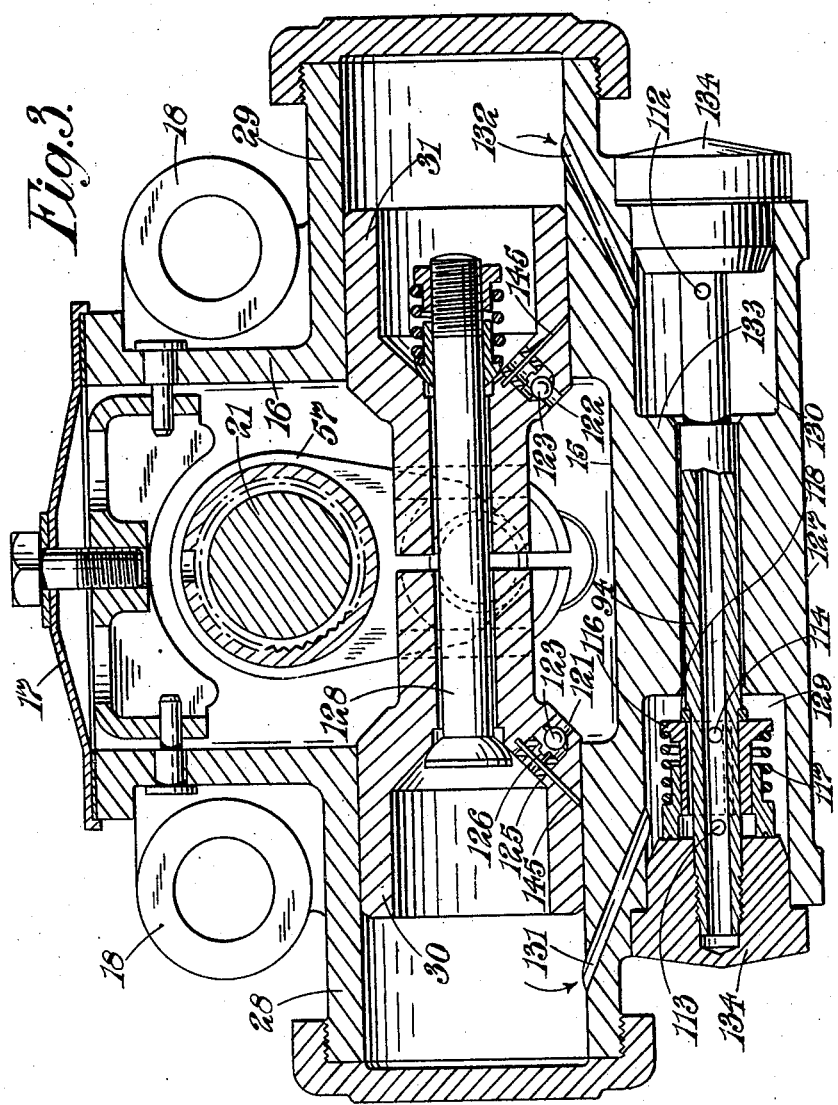

Patented Oct. 5, 1948

2,450,731

UNITED STATES PATENT OFFICE 2,450,731

SHOCK ABSORBER

Ernest William Johnson, Birmingham, England, assignor to Vandervell Products Limited, London, England, a British company Application March 19, 1946, Serial No. 655,434
In Great Britain March 12, 1945

Section 1, Public Law 690, August 8, 1946
Patent expires March 12, 1965

9 Claims. (Cl. 188—88)

This invention is for improvements in or relating to shock absorbers and has for one of its objects to provide suitable relief for pressures developing in the shock absorber. Another object of the invention is to provide a more advantageous construction and arrangement of parts than has heretofore been available.

According to the primary feature of the invention there is provided a double-acting shock absorber in which a restricted passage for the flow in both directions of damping fluid between two fluid containers, at the opposite ends of the shock absorber, is provided between the opposed surfaces of a metering rod and a bore into which the rod reaches, and in which a by-pass for the said restricted passage is provided through the interior of the metering rod, which shock absorber is characterised in that travel of the fluid through the by pass to relieve the pressure set up by the flow of fluid through the said restricted passage in both directions is controlled by two valves appropriated one to each direction of travel of the fluid through the said restricted passage and both operated by the pressure of the fluid. The said restricted passage may be provided between the opposed surfaces of the metering rod and a perforation in the main piston of the shock absorber into which the metering rod reaches in such manner that the piston reciprocates along it in the said fluid containers, and both of the said valves may be located in the same fluid container.

According to another feature of the invention, there is provided a shock absorber which embodies the primary feature of the invention and has a restricted passage for the flow of damping fluid between two main fluid containers when subjected to piston pressure is provided between the opposed surfaces of a metering rod and a bore into which the rod reaches, which shock absorber is characterised in that the said bore is formed in a wall inside a casing lying outside the piston and main fluid containers, which casing has fluid-receiving compartments at its ends, one on each side of the wall, which are respectively connected one to each of the main fluid containers.

There may be two separate lateral conduits in the metering rod each of which reaches from the by-pass to the exterior of the rod, and two valves respectively appropriated one to each of said conduits and each taking the form of a sleeve endwise slidable along the metering rod into and out of masking position with respect to the mouth of the lateral conduit to which it is appropriated. The said valve sleeves may be nested together around the metering rod, and a single spring encircling the sleeves may operate to oppose the movement of both of them under the pressure of the damping fluid or the sleeves may have independent springs for opposing their movement under the pressure of the damping fluid. Conveniently the valve sleeves are oppositely slidable into their respective masking positions.

According to a further feature of the invention, there is provided a shock absorber as aforesaid in which fluid container leakage is automatically made up from a recuperator chamber through a valve-controlled recuperator passage, which shock absorber is characterised in that the said recuperator passage is arranged to slope downwardly towards a conical seat for the valve, which is a ball, and is further characterised in that the ball valve is retained in the recuperator passage by a hollow plug whereof the end directed towards the valve is castellated. It is preferred to have the plug a driving fit in the recuperator passage. A double-acting shock absorber embodying this feature of the invention has a piston with an enlarged head at each end reciprocating horizontally in two cylinders which constitute the said fluid containers and which have the recuperator chamber between them, and is characterised in that the piston heads are of recessed formation, open at their remote ends, with conical bases to the recesses, the apices of which are directed towards each other, and is further characterised in that recuperator passages are located in the lower parts of the said conical bases with their ends which receive the said plugs obliquely and upwardly directed towards the open ends of the recesses. Preferably each recuperator passage is straight with its longitudinal centre line at right-angles to the conical base in which it is formed and is so situated that a drill for forming it can reach through the open end of the recess.

For a more complete understanding of the invention, there will now be described, by way of example only and with reference to the accompanying drawings, certain constructions of shock absorber according to the invention. It is to be understood, however, that the invention is not restricted to the precise constructional details set forth.

In these drawings—

Figure 1 is a sectional view of one form of shock absorber according to the invention;

Figure 2 is a detail cross-section on the line 2—2 of Figure 1;

Figure 3 is a view, corresponding to Figure 1, of a modified construction;

Figure 4 is a detail view of part of another construction;

Figure 5 is a detail view of part of a further construction; and

Figure 6 is an enlarged detail view of the valve structure in cylinder 28 of Figure 1.

Like reference numerals indicate like parts throughout the drawings.

Referring firstly to Figures 1 and 2, the construction shown therein is in some respects similar to certain of the constructions shown in British specification No. 434,154 and comprises a casing 15 with an upstanding centre barrel 16 having a cover plate 17. At the sides there are lugs 18 whereby the casing is mounted in place and the barrel 16 provides bearings for a rock shaft 21 which is connected to one of the parts to be controlled by the shock absorber. The casing 15 has fluid container cylinders 28 and 29 in which are pistons 30 and 31 which are received on a sleeve 32 and a seal is made between each piston and the appropriate end of the sleeve. The outer ends of the cylinders 28 and 29 have end caps 40 and 41 into both of which a metering rod 94 is screwed. The metering rod 94 reaches right through the interior of the sleeve 32 and the restricted passage through which the damping fluid passes between the cylinders 28 and 29 lies between the opposed surfaces of the sleeve 32 and the metering rod 94. The barrel 16 constitutes a recuperator chamber from which there is made up any loss of damping fluid from the two cylinders. Inside the casing 15 there is attached to the rock shaft 21 a rock arm 57. A saddle piece 66, secured to the barrel 16 by pins 67, anchors the cover 17.

In use it will be appreciated that the fluid will be forced from the cylinder 28 to the cylinder 29 and vice versa along the restricted passage between the sleeve 32 and the metering rod 94 as the rock shaft oscillates.

The reference numerals thus far employed are as in British specification No. 434,154.

At the right-hand end of the metering rod 94, as seen in Figure 1, there is a series of lateral conduits 112 establishing communication between the interior of the cylinder 29 and the interior of the rod 94, and at the left-hand end of the rod there are two series 113 and 114 of lateral conduits. The conduits 113 are controlled by a sleeve valve 115 and the conduits 114 are controlled by a sleeve valve 116. These two sleeve valves are nested together with the valve 116 directly engaging the rod 94 and the valve 115 engaging the outside of the valve 116. The valves are urged endwise in opposite directions by a single spring 117 into their closing positions, the valve 115 against the cap 40 and valve 116 against a shoulder or abutment 118 on the rod 94. The inner face of the valve 116 is longitudinally channelled at 119 (see particularly Figure 2). The portion of the valve 116 on which the valve 115 slides is long enough to permit adequate longitudinal travel of the latter to the right but is not so long as in its own longitudinal travel to the left to engage the cap 40 before it has uncovered the lateral conduit 114 it controls. The valve-controlled passage along the interior of the rod 94 constitutes a by-pass for the restricted passage between the exterior of this rod and the sleeve 32 so that undue pressure in either of the cylinders 28 and 29 may be relieved. The valve 115 has the part 120 of its bore enlarged, and the base 120a of the enlargement provides a surface whereby fluid under pressure in the interior of the rod 94 being expelled from the cylinder 29 can force the valve to the right thereby uncovering the conduits 113. This by-pass, however, is only operative for movement of the fluid in one direction through the said restricted passage. That is to say it is operative to control or relieve the pressure in the cylinder 29 but not the pressure in the cylinder 28. To enable the pressure in the cylinder 28 to be controlled or relieved automatically, the diameter of the shoulder or abutment 118 is made smaller than the diameter of that portion of the valve 116 on which the valve 115 slides. This difference in diameter, provides a larger surface area exposed to the fluid on side 116a of member 116 than on side 116b, so that the pressure of the fluid in cylinder 28, due to this difference in surface area, urges valve 116 to move towards the left against the pressure of spring 117. Thus undue pressure in the cylinder 28 is able to unmask the right-hand series of lateral conduits and permit fluid to flow through the by-pass from the cylinder 28 to the cylinder 29. The action is similar to that of the left-hand sleeve valve in relieving the pressure in the cylinder 29. By choosing suitable sizes for the appropriate parts of the sleeve valves any desired degree of control of maximum pressure in the cylinders can be obtained. The maximum allowable pressure in the one cylinder may thus be made different from that in the other cylinder. Higher or lower pressures may also be arranged for by a suitable choice of spring. The longitudinal channels 119 tend to prevent turbulence and also enable both sets of lateral conduits 113 and 114 to allow the passage of damping fluid whenever either valve opens.

As already mentioned, the barrel 16 constitutes a recuperator chamber. It is connected to the cylinders 28 and 29 by passages 121 and 122 which are controlled by ball valves 123. The bases 124 of the piston heads are conical with the apices of the cones directed towards each other, and in the lower part of each conical base there is drilled a straight recuperator passage 121, 122 which slopes downwardly. Each passage is larger at its upper portion than at its lower portion and provides a conical seat for the ball valve 123. Through the seat, when not closed by the ball, there is communication with the recuperator chamber below the piston head. The recuperator passage is at right-angles to the conical base 124 of the piston head and so situated that a drill for forming it can reach through the open end of the recess in the piston head. To retain the ball in the recuperator passage, a hollow plug 125 is driven into the passage above the ball, the lower end of the plug being castellated at 126 to permit flow of fluid even though the ball may be bearing against the plug. Instead of, or in addition to the plug 125 being a driving fit, it may be retained in place by a pin such as 145. There is, of course, sufficient room for the recuperating fluid to force the ball off its seat when necessary, but the downward slope of the passage ensures that the ball will tend to return by gravity to its seat.

In the construction shown in Figure 3, the said restricted passage and the metering rod do not extend through the main piston of the shock absorber, but are situated in a second casing 127 below the main casing 15. The two parts of the piston are secured together by a bolt or the like 128 which does not permit the passage of fluid through or past it. The casing 127 is integral with the main casing 15, and it is formed near its ends with fluid-receiving compartments 129 and 130 which are respectively connected one to each of the aforesaid fluid containers 28 and 29 by passages 131 and 132. Between the compartments there is a thick wall 133 which is bored to allow the metering rod 94 to reach through it with sufficient clearance to constitute the requisite restricted passage for the damping fluid. The ends of the second casing have closure plugs 134 which support the metering rod 94. The latter is hollow to serve as a by-pass for the restricted passage, and the by-pass is valve-controlled in the manner described above.

The valve arrangement shown in Figure 4 is very similar to that shown in Figures 1–3, except that the outside of the sleeve valve 116 is reduced at 135 adjacent to the shoulder or abutment 118 on the rod 94. The diameter of this reduced part 135 is made smaller than the diameter of that portion of the valve 116 on which the valve 115 slides. Thus the pressure in the surrounding fluid container is able to open the valve 116 to relieve the pressure. In this construction, the valves 115 and 116 have the remote ends of their bores enlarged at 136 and 137 respectively to leave internal cavities adjacent to the abutments against which they close, so that a minimum amount of movement of the valves will give full flow through the lateral conduits 113 and 114 and avoid valve chatter.

In the construction shown in Figure 5, the valves 115 and 116 are not nested, but each is received directly on the outside of the rod 94. Between the valves, the rod 94 carries an additional abutment 138 which is extended at 139 to form a shroud with the bore of which the valve 116 makes sliding engagement. The valves are urged towards closing position by separate springs 140 and 141 respectively, and the diameter of the portion 135 of the valve 116 is made smaller than the diameter of that portion of this valve which slides into the shroud 139. The outer end of the bore of the valve 116 is chamfered at 142 instead of being cylindrically enlarged as is the case with the valve 115. The additional lateral conduits 143 are provided as vents for the space 144.

It will be appreciated that in all the valve arrangements according to the present invention, there is a valve-controlled by-pass in both directions through the interior of the metering rod to relieve undue pressure in the fluid containers.

It is to be understood that the invention is not restricted to the precise constructional details set forth.

I claim:

1. In a double-acting shock absorber in which fluid friction is employed for damping, the combination of two main fluid containers at the opposite ends of the shock absorber, a piston reciprocable in said main fluid containers, a hollow metering rod, a casing lying outside the piston and main fluid containers and having an internal wall with fluid-receiving compartments one on each side of the wall, means for connecting said compartments respectively one to each of the main fluid containers, which wall has a perforation through it through which the metering rod reaches so that the opposed surfaces of the perforation and metering rod provide between them a restricted passage connecting the said fluid-receiving compartments, through which passage the fluid is forced by the said piston, and the interior of which metering rod constitutes a by-pass for the said restricted passage, which hollow metering rod is formed with lateral conduits extending through its wall from the interior to the exterior of said rod, and two valves cooperating with said lateral conduits whereby the travel of the fluid through the by-pass to relieve the pressure set up by the flow of fluid through the said restricted passage in both directions is controlled, which valves are appropriated one to each direction of travel of the fluid through the said restricted passage and are both operated by the pressure of the fluid.

2. In a double-acting shock absorber in which fluid friction is employed for damping, the combination of two fluid containers at the opposite ends of the shock absorber, a piston reciprocable in said containers, a hollow metering rod which reaches through a perforation so situated in the interior of the shock absorber that the opposed surfaces of the perforation and metering rod provide between them a restricted passage connecting the said fluid containers, through which passage the fluid is forced by the said piston, and the interior of which metering rod constitutes a by-pass for the said restricted passage, which hollow metering rod is formed with two separate lateral conduits in the metering rod each of which reaches from the by-pass to the exterior of the rod, and two sleeve valves respectively appropriated one to each of said conduits and one to each direction of travel of the fluid through the said restricted passage, both operated by the pressure of the fluid, and each endwise slidable along the metering rod into and out of masking position with respect to the mouth of the lateral conduit to which it is appropriated, whereby the travel of the fluid through the by-pass to relieve the pressure set up by the flow of fluid through the said restricted passage in both directions is controlled.

3. In a double-acting shock absorber in which fluid friction is employed for damping, the combination of two fluid containers at the opposite ends of the shock absorber, a piston reciprocable on said containers, a hollow metering rod which reaches through a perforation so situated in the interior of the shock absorber that the opposed surfaces of the perforation and metering rod provide between them a restricted passage connecting the said fluid containers, through which passage the fluid is forced by the said piston, and the interior of which metering rod constitutes a by-pass for the said restricted passage, which hollow metering rod is formed with two separate lateral conduits in the metering rod each of which reaches from the by-pass to the exterior of the rod, and two sleeve valves nested together around the metering rod respectively appropriated one to each of said conduits and one to each direction of travel of the fluid through the said restricted passage, both operated by the pressure of the fluid, and each endwise slidable along the metering rod into and out of masking position with respect to the mouth of the lateral conduit to which it is appropriated, whereby the travel of the fluid through the by-pass to relieve the pressure set up by the flow of fluid through the said restricted passage in both directions is controlled.

4. In a double-acting shock absorber in which fluid friction is employed for damping, the combination of two fluid containers at the opposite ends of the shock absorber, a piston reciprocable in said containers, a hollow metering rod which reaches through a perforation so situated in the interior of the shock absorber that the opposed surfaces of the perforation and metering rod provide between them a restricted passage connecting the said fluid containers, through which passage the fluid is forced by the said piston, and the interior of which metering rod constitutes a by-pass for the said restricted passage, which hollow metering rod is formed with two separate lateral conduits in the metering rod each of which reaches from the by-pass to the exterior of the rod, two sleeve valves nested together around the metering rod and respectively appropriated one to each of said conduits and one to each direction of travel of the fluid through the said restricted passage, and both operated by the pressure of the fluid and each endwise slidable along the metering rod into and out of masking position with respect to the mouth of the lateral conduit to which it is appropriated, whereby the travel of the fluid through the by-pass to relieve the pressure set up by the flow through the said restricted passage in both directions is controlled, and a single spring encircling the sleeve valves and operating to oppose the movement of both of them under the pressure of the said fluid.

5. In a double-acting shock absorber in which fluid friction is employed for damping, the combination of two fluid containers at the opposite ends of the shock absorber, a piston reciprocable in said containers, a hollow metering rod which reaches through a perforation so situated in the interior of the shock absorber that the opposed surfaces of the perforation and metering rod provide between them a restricted passage connecting the said fluid containers, through which passage the fluid is forced by the said piston, and the interior of which metering rod constitutes a by-pass for the said restricted passage, which hollow metering rod is formed with two separate lateral conduits in the metering rod each of which reaches from the by-pass to the exterior of the rod, two sleeve valves nested together around the metering rod and respectively appropriated one to each of said conduits and one to each direction of travel of the fluid through the said restricted passage, and both operated by the pressure of the fluid and each endwise slidable along the metering rod into and out of masking position with respect to the mouth of the lateral conduit to which it is appropriated, whereby the travel of the fluid through the by-pass to relieve the pressure set up by the flow of fluid through the said restricted passage in both directions is controlled, and independent springs appropriated to the sleeve valves for opposing their movement under the pressure of the said fluid.

6. In a double-acting shock absorber in which fluid friction is employed for damping, the combination of two fluid containers at the opposite ends of the shock absorber, a piston reciprocable in said containers, a hollow metering rod which reaches through a perforation so situated in the interior of the shock absorber that the opposed surfaces of the perforation and metering rod provide between them a restricted passage connecting the said fluid containers, through which passage the fluid is forced by the said piston, and the interior of which metering rod constitutes a by-pass for the said restricted passage, which hollow metering rod is formed with two separate lateral conduits in the metering rod each of which reaches from the by-pass to the exterior of the rod, and two sleeve valves respectively appropriated one to each of said conduits and one to each direction of travel of the fluid through the said restricted passage, both operated by the pressure of the fluid, and oppositely slidable endwise along the metering rod each into and out of masking position with respect to the mouth of the lateral conduit to which it is appropriated, whereby the travel of the fluid through the by-pass to relieve the pressure set up by the flow of fluid through the said restricted passage in both directions is controlled.

7. In a double-acting shock absorber in which fluid friction is employed for damping, the combination of two main fluid containers at the opposite ends of the shock absorber, a piston reciprocable in said main fluid containers, a recuperative fluid container connected to said main fluid containers by a recuperator passage whereby leakage from the main fluid containers is automatically made up, which recuperator passage slopes downwardly, a conical valve seat at the lower end of said passage, a ball valve in said passage to be received against said seat, a hollow retaining plug in said passage to prevent undue lift of the ball valve from its seat, the end of which plug directed towards the ball valve is castellated, a hollow metering rod which reaches through a perforation so situated in the interior of the shock absorber that the opposed surfaces of the perforation and metering rod provide between them a restricted passage connecting the said main fluid containers, through which passage the fluid is forced by the said piston, and the interior of which metering rod constitutes a by-pass for the said restricted passage, which hollow metering rod is formed with lateral conduits extending through its wall from the interior to the exterior of said rod, and two valves co-operating with said lateral conduits whereby the travel of the fluid through the by-pass to relieve the pressure set up by the flow of fluid through the said restricted passage in both directions is controlled, which valves are appropriated one to each direction of travel of the fluid through the said restricted passage and are both operated by the pressure of the fluid.

8. In a double-acting shock absorber in which fluid friction is employed for damping, the combination of two main fluid containers at the opposite ends of the shock absorber, a piston reciprocable horizontally in said main fluid containers, which piston has at each end an enlarged head of recessed formation with a conical base to the recess, the recesses being open at opposite ends of the piston and the apices of the conical bases being directed towards each other, a recuperator fluid container located between the main fluid containers and connected thereto by recuperator passages whereby leakage from the main fluid containers is automatically made up, which recuperator passages are located in the lower parts of the said conical bases and slope downwardly so that their upper ends are obliquely directed towards the open ends of the recesses, conical valve seats at the lower ends of said passages, ball valves in said passages to be received against said seats, hollow retaining plugs in said passages to prevent undue lift of the ball valves from the seats, the ends of which plugs directed towards the ball valves are castellated, a hollow metering rod which reaches through a perforation so situated in the interior of the shock absorber that the opposed surfaces of the perforation and metering rod provide between them a restricted passage connecting the said main fluid containers, through which passage the fluid is forced by the said piston, and the interior of which metering rod constitutes a by-pass for the said restricted passage, which hollow metering rod is formed with lateral conduits extending through its wall from the interior to the exterior of said rod, and two valves co-operating with said lateral conduits whereby the travel of the fluid through the by-pass to relieve the pressure set up by the flow of fluid through the said restricted passage in both directions is controlled, which valves are appropriated one to each direction of travel of the fluid through the said restricted passage and are both operated by the pressure of the fluid.

9. In a double-acting shock absorber in which fluid friction is employed for damping, the combination of two main fluid containers at the opposite ends of the shock absorber, a piston reciprocable horizontally in said main fluid containers, which piston has at each end an enlarged head of recessed formation with a conical base to the recess, the recesses being open at opposite ends of the piston and the apices of the conical bases being directed towards each other, a recuperator fluid container located between the main fluid containers and connected thereto by recuperator passages whereby leakage from the main fluid containers is automatically made up, which recuperator passages are located in the lower parts of the said conical bases, are straight, have their longitudinal centre lines at right-angles to the conical bases and are so situated that drills for forming them can reach through the open ends of the recesses, conical valve seats at the lower ends of said passages, ball valves in said passages to be received against said seats, hollow retaining plugs in said passages to prevent undue lift of the ball valves from the seats, the ends of which plugs directed towards the ball valves are castellated, a hollow metering rod which reaches through a perforation so situated in the interior of the shock absorber that the opposed surfaces of the perforation and metering rod provide between them a restricted passage connecting the said main fluid containers, through which passage the fluid is forced by the said piston, and the interior of which metering rod constitutes a by-pass for the said restricted passage, which hollow metering rod is formed with lateral conduits extending through its wall from the interior to the exterior of said rod, and two valves co-operating with said lateral conduits whereby the travel of the fluid through the by-pass to relieve the pressure set up by the flow of fluid through the said restricted passage in both directions is controlled, which valves are appropriated one to each direction of travel of the fluid through the said restricted passage and are both operated by the pressure of the fluid.

ERNEST WILLIAM JOHNSON.

REFERENCES CITED

The following references are of record in the file of this patent:

UNITED STATES PATENTS

| Number | Name | Date |
| --- | --- | --- |
| 2,331,782 | Johnson | Oct. 12, 1942 |